(12) United States Patent
Wu

(10) Patent No.: US 10,757,755 B2
(45) Date of Patent: Aug. 25, 2020

(54) METHOD AND APPARATUS FOR COMMUNICATION BETWEEN WEARABLE DEVICE AND MOBILE TERMINAL

(71) Applicant: Huawei Technologies Co., Ltd., Shenzhen (CN)

(72) Inventor: Huangwei Wu, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 15/774,706

(22) PCT Filed: Jun. 16, 2016

(86) PCT No.: PCT/CN2016/086002
§ 371 (c)(1),
(2) Date: May 9, 2018

(87) PCT Pub. No.: WO2017/214930
PCT Pub. Date: Dec. 21, 2017

(65) Prior Publication Data
US 2018/0324897 A1    Nov. 8, 2018

(51) Int. Cl.
*H04W 88/04* (2009.01)
*H04W 48/18* (2009.01)
(Continued)

(52) U.S. Cl.
CPC ............ *H04W 88/04* (2013.01); *G06F 1/163* (2013.01); *H04B 7/15* (2013.01); *H04B 7/15528* (2013.01);
(Continued)

(58) Field of Classification Search
CPC .... G06F 1/3203; G06F 1/1694; G06F 1/3231; G06F 2200/1637; H04W 88/04; H04W 48/18; H04W 8/005; H04M 1/7253
See application file for complete search history.

(56) References Cited

U.S. PATENT DOCUMENTS 8,761,147 B2    6/2014  Sun et al.
2015/0301574 A1*  10/2015  Kim .................. G06F 1/1694
                                                                    345/156
(Continued)

FOREIGN PATENT DOCUMENTS

CN        203436329 U    2/2014
CN        104519151 A    4/2015
(Continued)

OTHER PUBLICATIONS

Machine Translation and Abstract of Chinese Publication No. CN104519151, Apr. 15, 2015, 16 pages.
(Continued)

*Primary Examiner* — Un C Cho
*Assistant Examiner* — Peter K Mak
(74) *Attorney, Agent, or Firm* — Conley Rose, P.C.

(57) ABSTRACT

The present disclosure discloses a method for communication between a wearable device and a mobile terminal. The method includes the wearable device determines whether a first communications link with the mobile terminal is able to be established, when yes, the wearable device receives a notification message sent by the mobile terminal by the first communications link, when not, the wearable device determines whether a second communications link with the mobile terminal is able to be established, when yes, the wearable device receives a notification message sent by the mobile terminal by the second communications link, when not, the wearable device connects to a network server, and receives a notification message sent by the mobile terminal by the network server.

16 Claims, 7 Drawing Sheets

(51) Int. Cl.

| | |
|---|---|
| *H04W 4/80* | (2018.01) |
| *H04L 29/08* | (2006.01) |
| *H04B 7/155* | (2006.01) |
| *G06F 1/16* | (2006.01) |
| *H04B 7/15* | (2006.01) |
| *H04M 1/725* | (2006.01) |
| *H04W 88/06* | (2009.01) |
| *H04W 8/00* | (2009.01) |

(52) U.S. Cl.
CPC .......... *H04L 67/02* (2013.01); *H04M 1/7253* (2013.01); *H04M 2250/02* (2013.01); *H04W 4/80* (2018.02); *H04W 8/005* (2013.01); *H04W 48/18* (2013.01); *H04W 88/06* (2013.01)

(56) References Cited

U.S. PATENT DOCUMENTS

| | | | | |
|---|---|---|---|---|
| 2016/0165651 | A1* | 6/2016 | Pathuri | H04W 76/11 |
| | | | | 370/329 |
| 2016/0227009 | A1* | 8/2016 | Kim | B60K 35/00 |
| 2016/0299779 | A1* | 10/2016 | Kulkarni | H04L 63/0492 |
| 2016/0316364 | A1* | 10/2016 | Blanco | H04W 12/06 |
| 2016/0381328 | A1* | 12/2016 | Zhao | G06K 9/00342 |
| | | | | 348/154 |
| 2017/0124853 | A1* | 5/2017 | Mehta | H04W 4/90 |
| 2017/0359797 | A1* | 12/2017 | Bradley | H04L 51/24 |
| 2018/0213578 | A1* | 7/2018 | Tachibana | G06K 7/10722 |

FOREIGN PATENT DOCUMENTS

| | | | |
|---|---|---|---|
| CN | 204290930 U | | 4/2015 |
| CN | 105245507 A | | 1/2016 |
| CN | 105263101 A | | 1/2016 |
| CN | 105306567 A | | 2/2016 |
| WO | 2015074374 A1 | | 5/2015 |
| WO | 201515440 A1 | | 10/2015 |

OTHER PUBLICATIONS

Machine Translation and Abstract of Chinese Publication No. CN105245507, Jan. 13, 2016, 13 pages.
Machine Translation and Abstract of Chinese Publication No. CN105263101, Jan. 20, 2016, 7 pages.
Machine Translation and Abstract of International Publication No. WO2015154440, Oct. 15, 2015, 9 pages.
Foreign Communication From a Counterpart Application, PCT Application No. PCT/CN2016/086002, English Translation of International Search Report dated Mar. 13, 2017, 2 pages.
Machine Translation and Abstract of International Publication No. WO2015074374, May 28, 2015, 16 pages.
Machine Translation and Abstract of Chinese Publication No. CN203436329, Feb. 19, 2014, 6 pages.
Machine Translation and Abstract of Chinese Publication No. CN204290930, Apr. 22, 2015, 8 pages.
Foreign Communication From a Counterpart Application, Chinese Application No. 201680016557.1, Chinese Office Action dated Jun. 27, 2019, 13 pages.
Machine Translation and Abstract of Chinese Publication No. CN105306567, Feb. 3, 2016, 52 pages.
Foreign Communication From a Counterpart Application, Chinese Application No. 201680016557.1, Chinese Office Action dated Dec. 19, 2019, 14 pages.

* cited by examiner

METHOD AND APPARATUS FOR COMMUNICATION BETWEEN WEARABLE DEVICE AND MOBILE TERMINAL

CROSS-REFERENCE TO RELATED APPLICATIONS

This application is a National Stage of International Application No. PCT/CN2016/086002, filed on Jun. 16, 2016, which is hereby incorporated by reference in its entirety.

TECHNICAL FIELD

The present disclosure relates to the field of mobile communications, and specifically, to a method and an apparatus for communication between a wearable device and a mobile terminal.

BACKGROUND

With prosperous development of a wearable technology, wearable devices become widely popular among consumers, and more functions have been integrated, enriching people's life. A current wearable device can usually connect to and communicate with a mobile phone through a Bluetooth® module using a Bluetooth protocol. In a typical application scenario, when a user's mobile phone receives a message, such as an incoming call notification, an SMS message, or an application program notification, if the mobile phone can communicate with the wearable device using Bluetooth, the mobile phone pushes the message to the wearable device using Bluetooth, to display the message on the wearable device.

However, a communication range of Bluetooth is quite limited and usually does not exceed 10 meters. Therefore, when the user does not carry the mobile phone, for example, when the user is doing sports outdoors, the wearable device cannot keep Bluetooth communication with the mobile phone, and therefore cannot receive the push message from the mobile phone in a timely manner.

SUMMARY

In view of this, embodiments of the present disclosure provide a method and an apparatus for communication between a wearable device and a mobile terminal in order to improve a mobile communication capability of the wearable device, and prevent the wearable device from missing a notification message sent by the mobile terminal.

According to a first aspect, an embodiment of the present disclosure provides a method for communication between a wearable device and a mobile terminal, where the method includes determining, by the wearable device, whether the wearable device can establish a first communications link with the mobile terminal using a first communications protocol, and when the wearable device establishes the first communications link with the mobile terminal using the first communications protocol, receiving, by the wearable device using the first communications link, a notification message sent by the mobile terminal, or when the wearable device cannot establish the first communications link with the mobile terminal using the first communications protocol, determining, by the wearable device, whether the wearable device can establish a second communications link with the mobile terminal using a second communications protocol, and when the wearable device establishes the second communications link with the mobile terminal using the second communications protocol, receiving, by the wearable device using the second communications link, a notification message sent by the mobile terminal, or when the wearable device cannot establish the second communications link with the mobile terminal using the second communications protocol, connecting to, by the wearable device, a network server using the second communications protocol, and receiving, using the network server, a notification message sent by the mobile terminal.

With reference to the first aspect, in a first implementation of the first aspect, that the wearable device establishes the first communications link with the mobile terminal using the first communications protocol is periodically detecting, by the wearable device, whether the wearable device can communicate with the mobile terminal using the first communications protocol, that is, periodically detecting whether the first communications link is maintained with the mobile terminal. A detection technology may include detecting whether an IP address of the mobile terminal can be pinged successfully, whether the wearable device can receive a Bluetooth signal from the mobile terminal, or the like.

With reference to the first aspect, in a second implementation of the first aspect, the method for communication between the wearable device and the mobile terminal further includes, when the wearable device cannot establish the second communications link with the mobile terminal using the second communications protocol, determining, by the wearable device, whether the wearable device can establish a third communications link with the mobile terminal using a third communications protocol. Similarly, if the wearable device supports a fourth, a fifth, . . . , or a like communications protocol, the wearable device may also determine whether the wearable device can establish a fourth, a fifth, . . . , or a like communications link with the mobile terminal using the fourth, the fifth, . . . , or the like communications protocol, and when the wearable device establishes the fourth, the fifth, . . . , or the like communications link with the mobile terminal using the fourth, the fifth, . . . , and the like communications protocol, the wearable device receives, using the fourth, the fifth, . . . , or the like communications link, a notification message sent by the mobile terminal, or when the wearable device cannot establish the fourth, the fifth, . . . , or the like communications link with the mobile terminal using the fourth, the fifth, . . . , and the like communications protocol, the wearable device connects to a network server using the fourth, the fifth, . . . , or the like communications protocol, and receives, using the network server, a notification message sent by the mobile terminal.

With reference to the first aspect, in a third implementation of the first aspect, that when the wearable device establishes the second communications link with the mobile terminal using the second communications protocol, receiving, by the wearable device using the second communications link, a notification message sent by the mobile terminal is, when the second communications protocol is a short-distance wireless communications protocol, discovering and connecting to, by the wearable device, the mobile terminal using a local-area-network device discovery protocol, and receiving, using the second communications link, the notification message sent by the mobile terminal. The local-area-network device discovery protocol can be used to query whether the wearable device and the mobile terminal are in a same local area network. For example, the wearable device and the terminal device can be interconnected using a same Wi-Fi network.

With reference to the third implementation of the first aspect, in a fourth implementation of the first aspect, the local-area-network device discovery protocol includes a Universal Plug and Play protocol, a zero-configuration networking protocol, or a Digital Living Network Alliance protocol.

With reference to the first aspect, in a fifth implementation of the first aspect, the connecting to, by the wearable device, a network server using the second communications protocol, and receiving, using the network server, a notification message sent by the mobile terminal is receiving, from the network server by the wearable device, the notification information sent by the mobile terminal and forwarded by the network server.

With reference to the first aspect, in a sixth implementation of the first aspect, the connecting to, by the wearable device, a network server using the second communications protocol, and receiving, using the network server, a notification message sent by the mobile terminal is obtaining, from the network server by the wearable device, a token of the mobile terminal, and receiving, using the token, the notification information sent by a notification information server, where the notification information server is configured to send notification information to the mobile terminal.

With reference to the first aspect, in a seventh implementation of the first aspect, the connecting to, by the wearable device, to a network server using the second communications protocol, and receiving, using the network server, a notification message sent by the mobile terminal is receiving, from the network server by the wearable device, internet protocol (IP) connection information of the mobile terminal, establishing, by the wearable device, an IP connection to the mobile terminal according to the IP connection information of the mobile terminal, and receiving, using the IP connection, the notification information sent by the mobile terminal.

With reference to the first aspect, in an eighth implementation of the first aspect, the method for communication between the wearable device and the mobile terminal further includes, when the wearable device has at least two short-distance wireless communications modules, attempting to establish a communications link with the mobile terminal in sequence according to a preset order.

With reference to the first aspect, in a ninth implementation of the first aspect, the method for communication between the wearable device and the mobile terminal further includes, when the wearable device has at least two long-distance wireless communications modules, attempting to establish a communications link with the mobile terminal in sequence according to a preset order.

The foregoing solutions greatly enhance a mobile communications capability of the wearable device and prevent the wearable device from missing a notification message sent by the mobile terminal.

According to a second aspect, an embodiment of the present disclosure provides an apparatus, where the apparatus includes a memory, a processor, a radio frequency circuit, and one or more programs, where the one or more programs are stored in the memory and are configured to be executed by the processor, the one or more programs include an instruction, and the instruction is used to execute the following actions: determining, by a wearable device, whether the wearable device can establish a first communications link with a mobile terminal using a first communications protocol, and when the wearable device establishes the first communications link with the mobile terminal using the first communications protocol, receiving, by the wearable device using the first communications link, a notification message sent by the mobile terminal, or when the wearable device cannot establish the first communications link with the mobile terminal using the first communications protocol, determining, by the wearable device, whether the wearable device can establish a second communications link with the mobile terminal using a second communications protocol, and when the wearable device establishes the second communications link with the mobile terminal using the second communications protocol, receiving, by the wearable device using the second communications link, a notification message sent by the mobile terminal, or when the wearable device cannot establish the second communications link with the mobile terminal using the second communications protocol, connecting to, by the wearable device, a network server using the second communications protocol, and receiving, using the network server, a notification message sent by the mobile terminal. A specific method is the same as the method in the first aspect.

According to a third aspect, an embodiment of the present disclosure provides an apparatus, where the apparatus includes a memory, a processor, and a radio frequency circuit, where the processor establishes, according to a connection method stored in the memory, a communications link between a wearable device and a mobile terminal using the radio frequency circuit, and the connection method is determining, by the wearable device, whether the wearable device can establish a first communications link with the mobile terminal using a first communications protocol, and when the wearable device establishes the first communications link with the mobile terminal using the first communications protocol, receiving, by the wearable device using the first communications link, a notification message sent by the mobile terminal, or when the wearable device cannot establish the first communications link with the mobile terminal using the first communications protocol, determining, by the wearable device, whether the wearable device can establish a second communications link with the mobile terminal using a second communications protocol; and when the wearable device establishes the second communications link with the mobile terminal using the second communications protocol, receiving, by the wearable device using the second communications link, a notification message sent by the mobile terminal, or when the wearable device cannot establish the second communications link with the mobile terminal using the second communications protocol, connecting to, by the wearable device, a network server using the second communications protocol, and receiving, using the network server, a notification message sent by the mobile terminal. A specific method is the same as the method in the first aspect.

According to a fourth aspect, an embodiment of the present disclosure provides an apparatus for communication between a wearable device and a mobile terminal, where the apparatus includes a detection unit, a connection unit, a storage unit, and a notification unit; the detection unit is configured to detect, during establishment of a communications link between the wearable device and the mobile terminal, a wireless signal that is supported by the wearable device and that indicates that the wearable device can establish the wireless communications link, the connection unit is configured to access a corresponding wireless network according to a connection method stored in the storage unit, establish the communications link between the wearable device and the mobile terminal, and receive a notification message sent by the mobile terminal, the storage unit is configured to store the connection method for establishing the communications link between the wearable device and the mobile terminal, the notification unit is configured to present the notification message received by the wearable device from the terminal device; and the connection method is determining, by the wearable device, whether the wearable device can establish a first communications link with the mobile terminal using a first communications protocol, and when the wearable device establishes the first communications link with the mobile terminal using the first communications protocol, receiving, by the wearable device using the first communications link, a notification message sent by the mobile terminal, or when the wearable device cannot establish the first communications link with the mobile terminal using the first communications protocol, determining, by the wearable device, whether the wearable device can establish a second communications link with the mobile terminal using a second communications protocol, and when the wearable device establishes the second communications link with the mobile terminal using the second communications protocol, receiving, by the wearable device using the second communications link, a notification message sent by the mobile terminal, or when the wearable device cannot establish the second communications link with the mobile terminal using the second communications protocol, connecting to, by the wearable device, a network server using the second communications protocol, and receiving, using the network server, a notification message sent by the mobile terminal. A specific method is the same as the method in the first aspect.

According to a fifth aspect, an embodiment of the present disclosure provides a computer storage medium for storing one or more programs, where the one or more programs includes an instruction, and the instruction is used to execute the method in the first aspect.

The foregoing solutions resolve a problem that when the wearable device is excessively far from the mobile terminal, a notification message cannot be received using a Bluetooth connection, and enable the wearable device to be connected to the mobile terminal at any time, avoiding missing of prompt information.

DESCRIPTION OF EMBODIMENTS

Figure 1:
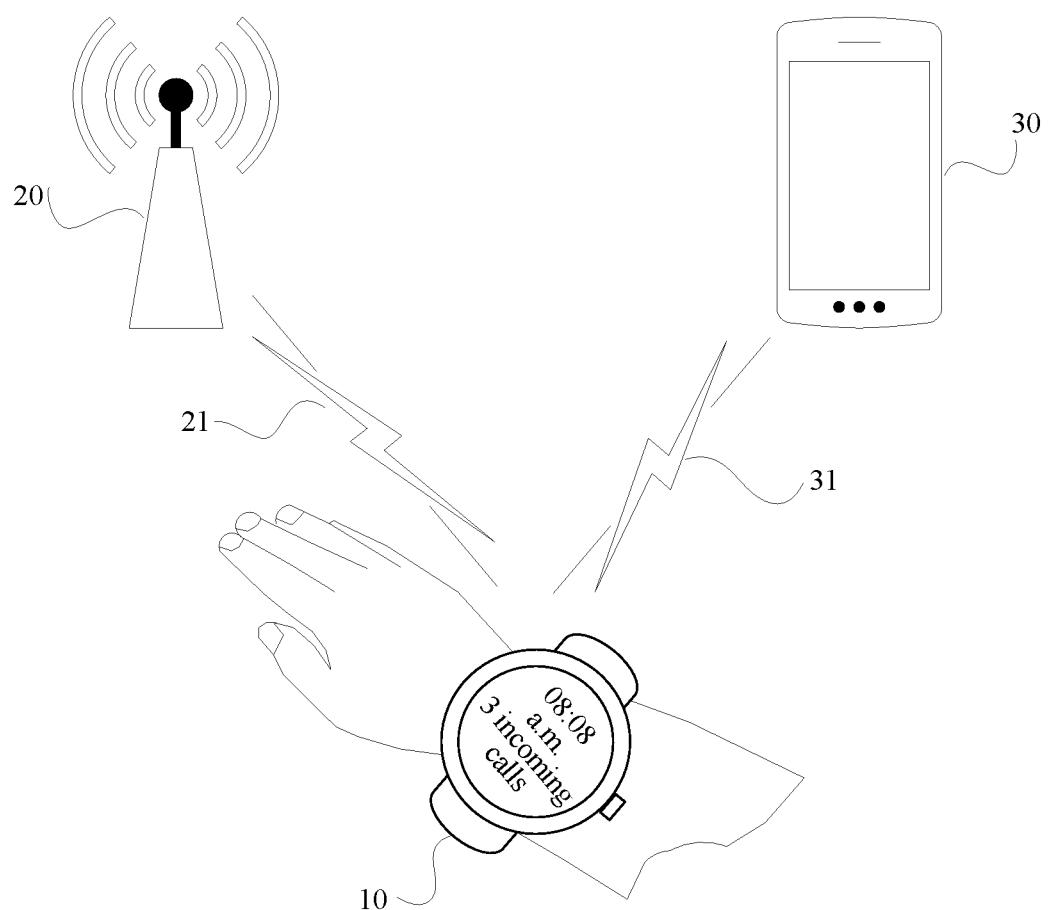
FIG. 1 is a schematic diagram of an application scenario of a smartwatch according to an embodiment of the present disclosure.

The technical solutions according to embodiments of the present disclosure are clearly described in the following with reference to the accompanying drawings of the embodiments.

In the embodiments of the present disclosure, a wearable device is a portable electronic device that is implanted into clothes, a decorative piece, or an accessory of a user and that can be directly worn on the body. Forms of the wearable device are too numerous to enumerate, and common forms are a watch, a hand ring, a ring, earrings, an anklet, glasses, a headband, a helmet, a hat, gloves, a necklace, shoes, socks, knee pads, a bag, a crutch, and the like. The wearable device implements powerful functions by means of software support, data exchange, and cloud-based interaction. In some embodiments of the present disclosure, the wearable device has one or more of the following functions a call service, a short message service (SMS), an email, a clock, a stopwatch, a camera, video recording, sound recording, voice recognition, scanning, a radio, multimedia playback, file browsing, mobile payment, positioning, a compass, physiological data collection (such as pulse, a heart rate, respiration, blood pressure, body temperature, movement steps, a movement speed, a moving track, climbing stairs, calorie consumption, and a sleep time), environmental monitoring (such as humidity, temperature, air quality, noise, and distance measurement), or the like.

In some embodiments of the present disclosure, the wearable device may implement radio communication with the mobile terminal (such as a mobile phone) to perform data transmission, synchronization of personal data of a user, and the like. For example, the wearable device may pair with the mobile phone using a Bluetooth module of the wearable device. After pairing is successful, the wearable device performs data communication with the mobile phone using Bluetooth. For another example, when the mobile phone receives a call, the user may use the wearable device to answer the call. For still another example, when the mobile terminal receives a message such as an SMS message or an application program notification, the user may read the message using the wearable device. It should be noted that there are multiple mobile terminals that can communicate with the wearable device, such as a smart phone, a tablet computer, a personal digital assistant, a portable computer, a wearable device, a virtual reality device, and a smart car. Some embodiments of the present disclosure describe a principle for interaction between the wearable device and the mobile terminal using a smartwatch and a mobile phone as an example. It can be understood that these embodiments are also applicable to another mobile terminal that can communicate with the wearable device.

Currently, communication between the wearable device and the mobile phone is implemented mainly using a short-distance wireless communications module. In addition to Bluetooth and Wi-Fi, common short-distance wireless communications modes include near field communication (NFC), a ZigBee technology, an Infrared Data Association (IrDA) technology, a ultra wideband (UWB) technology, wireless universal serial bus (USB), and the like. Some embodiments of the present disclosure describe a short-distance wireless communications technology using Bluetooth as an example. It can be understood that these embodiments are also applicable to another short-distance wireless communications technology.

In some embodiments of the present disclosure, the wearable device may have a long-distance wireless communications module. The long-distance wireless communications module may be a Global System for Mobile Communications (GSM), Code Division Multiple Access (CDMA), general packet radio service (GPRS), Wideband Code Division Multiple Access (WCDMA), Code Division Multiple Access 2000 (CDMA2000), Time Division-Synchronous Code Division Multiple Access (TD-SCDMA), Worldwide Interoperability for Microwave Access (WiMAX), high speed downlink packet access (HSDPA), high speed uplink packet access (HSUPA), Long Term Evolution (LTE), or LTE-Advanced module, or the like. Some embodiments of the present disclosure describe a long-distance wireless communications technology using LTE as an example. It can be understood that these embodiments are also applicable to another long-distance wireless communications technology.

As shown in FIG. 1, an embodiment of the present disclosure provides a smartwatch 10. The smartwatch 10 may perform radio communication with a network-side base station 20 or a mobile phone 30 in a wireless manner. For example, the smartwatch 10 may send a wireless signal to the base station 20 using a radio frequency circuit and an antenna of the smartwatch over a wireless communications link 21, to request the base station 20 to perform a wireless network service and process a specific service requirement of the smartwatch 10. For another example, the smartwatch 10 may pair with the mobile phone 30 using Bluetooth of the smartwatch. After pairing is successful, the smartwatch 10 performs data communication with the mobile phone 30 using a Bluetooth communications link 31. Certainly, the smartwatch 10 may perform data communication with the mobile phone using another wireless communications manner, such as a short-distance wireless communications technology. In addition, the smartwatch 10 may further detect an external environmental change using various sensors of the smartwatch 10. It can be understood that the smartwatch 10 is an example of the wearable device.

Figure 2:
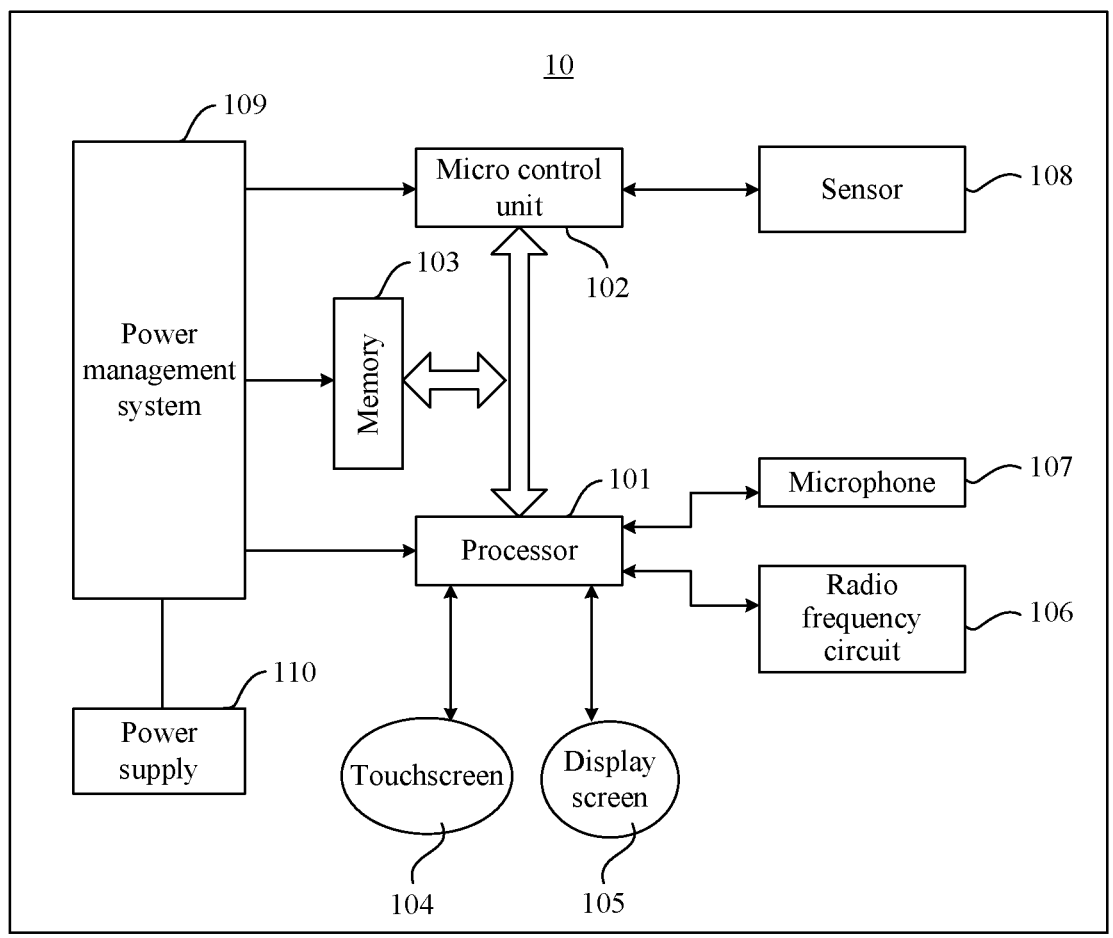
FIG. 2 is a schematic structural diagram of hardware of a smartwatch according to an embodiment of the present disclosure.

FIG. 2 is a schematic structural diagram of hardware of a smartwatch 10. It should be understood that the smartwatch 10 may have more or fewer components than those shown in the figure, a combination of two or more components, or components disposed differently. Various components shown in FIG. 1 may be implemented using hardware, software, or a combination of hardware and software, and may include one or more signal processing and/or application-specific integrated circuits.

The smartwatch 10 includes a processor 101, a micro control unit 102, a memory 103, a touchscreen 104, a display screen 105, a radio frequency circuit 106, a microphone 107, a sensor 108, a power management system 109, and a power supply 110. These components may perform communication using one or more communications buses or signal cables.

The processor 101, a control center of the smartwatch 10, is configured to perform system scheduling, is connected to various parts of the smartwatch 10 using various interfaces and lines, and implements various functions of the smartwatch 10 and processes data by running or executing a software program or an instruction set stored in the memory 103 and by invoking data stored in the memory 103 in order to perform overall monitoring on the smartwatch 10. Optionally, the processor 101 may include one or more processing units.

The micro control unit 102 is configured to implement functions such as controlling the sensor 108, performing operation on data of the sensor 108, and communicating with the processor 101.

The memory 103 may be configured to store the software program and a functional module. The processor 101 executes various function applications of the smartwatch 10 and processes data by running the software program and the functional module that are stored in the memory 103. The memory 103 may mainly include a program storage area and a data storage area. The program storage area may store an operating system, an application program required by at least one function (such as an audio playback function and an image playback function), and the like. The data storage area may store data (such as audio data and a phone book) created according to usage of the smartwatch 10, and the like. In addition, the memory 103 includes a high-speed random access memory, and further includes a non-volatile memory, for example, at least one disk storage device, a flash memory device, or another volatile solid-state storage device.

The touchscreen 104 is also referred to as a touch panel, and can collect a touch operation (such as an operation performed by a user on the touch panel or near the touch panel with a finger, a stylus, or any suitable object or accessory) of the user on or near the touch panel, and drive a corresponding connection apparatus according to a preset program. Optionally, the touchscreen 104 may include two parts, a touch detection apparatus and a touch controller. The touch detection apparatus detects a touch orientation of the user, detects a signal brought by a touch operation, and transmits the signal to the touch controller. The touch controller receives touch information from the touch detection apparatus, converts the touch information into contact coordinates, and sends the contact coordinates to the processor 101, and can receive a command sent by the processor 101 and execute the command. In addition to the touchscreen 104, the smartwatch 10 may further include another input device. The another input device may include but be not limited to a function key (such as a volume control key or an on/off key).

The display screen 105 may be configured to display information entered by the user, or information provided for the user, and various menus of the smartwatch 10. Optionally, the display screen 105 may be configured in a form of a liquid crystal display (LCD), an organic light-emitting diode (OLED), or the like. Further, the touchscreen 104 may cover the display screen 105. When detecting a touch operation on or near the touchscreen 104, the touchscreen 104 transmits the touch operation to the processor 101 to determine a touch event type. Then, the processor 101 provides corresponding visual output on the display screen 105 according to the touch event type. In FIG. 2, the touchscreen 104 and the display screen 105 serve as two independent components to implement input and output functions of the smartwatch 10. However, in some embodiments, the touchscreen 104 and the display screen 105 may be integrated to implement the input and output functions of the smartwatch 10.

The radio frequency (RF) circuit 106 may be configured to receive and send information, or receive and send a signal during a call, convert an electrical signal into an electromagnetic signal or convert an electromagnetic signal into an electrical signal, and communicate with a communications network and another communications device using the electromagnetic signal. In particular, after receiving downlink information of a base station, the radio frequency circuit 106 sends the downlink information of the base station to the processor 101 for processing, and sends related uplink data to the base station. The radio frequency circuit 106 may include a well-known circuit system implementing these functions, including but not limited to an antenna system, a radio frequency transceiver, one or more amplifiers, a tuner, one or more oscillators, a digital signal processor, a codec chip set, a subscriber identity module (SIM) card, and the like. The radio frequency circuit 106 may communicate with a network and another device by means of radio communication. The network is, for example, the Internet, an intranet, and/or a wireless network (for example, a cellular phone network, a wireless local area network, and/or a metropolitan area network). Any type of communications standard, protocol, or technology may be used for radio communication, including but not limited to Global System for Mobile Communications, Enhanced Data rates for GSM Evolution, high speed downlink packet access, high speed uplink packet access, Wideband Code Division Multiple Access, Code Division Multiple Access, Time Division Multiple Access, Bluetooth, wireless fidelity (for example, IEEE 802.11a, IEEE 802.11b, IEEE 802.11g, and/or IEEE 802.11n), or any other suitable communications protocol, including a communications protocol that has not been developed by the submission date of this document.

In some embodiments of the present disclosure, the radio frequency circuit 106 may include a short-distance wireless communications module and a long-distance wireless communications module. These wireless communications modules may include one or more antennas. The antenna may be in any shape, such as a ring antenna, a patch antenna, a slot antenna, an inverted-F antenna, a helical antenna, or a hybrid antenna of these shapes. Different types of antennas may be used for different frequency bands and frequency band combinations. For example, one type of antenna may be used to form a short-distance wireless communications antenna, and another type of antenna may be used to form a long-distance wireless communications antenna. Optionally, an antenna diversity solution may be used, and multiple redundancy antennas are used to process communication at a specific frequency band or at multiple specific frequency bands. The processor 101 may select, in real time based on signal strength measurement or other data, an antenna to be used. For example, the processor 101 may select an antenna for performing LTE communication with the base station.

Optionally, an antenna structure may include an impedance matching circuit, a filter circuit, and a switching circuit. The impedance matching circuit may ensure that an antenna is efficiently coupled to a transceiver circuit. The filter circuit may be configured to implement a frequency-based multiplex circuit, for example, a plexer, a duplexer, and a triplexer. The switching circuit may be configured to selectively couple the antenna to a desired port of the transceiver circuit. For example, in one operating mode, a switch may be configured to provide one of paths for routing to a given antenna, while in another operating mode, the switch may be configured to provide different paths of the paths for routing to the given antenna.

The smartwatch 10 may further include a microphone 107 that may convert a collected sound signal into an electrical signal. An audio circuit receives the electrical signal, and then converts the electrical signal into audio data. The audio circuit may also convert the audio data into an electrical signal and transmit the electrical signal to a speaker, and the speaker converts the electrical signal into a sound signal for output.

The smartwatch 10 may further include the sensor 108, such as a light sensor, a motion sensor, a gravity sensor, and another sensor. The light sensor may adjust luminance of the display screen 105 according to brightness of ambient light. The gravity sensor may complete conversion from gravity to an electrical signal. As a type of motion sensor, the acceleration sensor may detect accelerations in all directions (three axes in general), may detect, in a still state, a value and a direction of gravity, and may be applied to a wearable device posture recognition application (for example, magnetometer posture calibration), a vibration recognition related function (for example, a pedometer or tapping), and the like. Optionally, other sensors, such as a gyroscope, a barometer, a hygrometer, a thermometer, and an infrared sensor, may be further configured in the smartwatch 10, and details are not described herein.

The smartwatch 10 may further include the power supply 110 (for example, a battery) supplying power to each component. Optionally, the power supply 110 may be logically connected to the processor 101 using the power management system 109 in order to implement functions such as charge and discharge management and power consumption management using the power management system 109. Optionally, the power supply 110 may include a power fault detection circuit, a power converter or inverter, a power status indicator (for example, a light emitting diode (LED)), and any other component that is associated with generation, management, distribution of electric energy of the mobile phone.

Although not shown, the smartwatch 10 may further include a camera, a Global Positioning System (GPS) module, a vibration motor, an LED indicator, and the like. Details are not described herein.

A wearable device may implement connection and communication with a mobile terminal (a mobile phone is used as an example below) using a short-distance wireless communications technology (the Bluetooth technology is used as an example below). The Bluetooth technology is an ideal solution for a wearable device that is powered using a small battery. However, as a short-distance wireless communications technology, the Bluetooth technology has a disadvantage of a limited transmission distance. When far from the mobile phone, the wearable device cannot implement data communication with the mobile phone using a Bluetooth module. This may cause a user to miss a message pushed by the mobile phone, such as a phone call or an SMS message.

Figure 3:
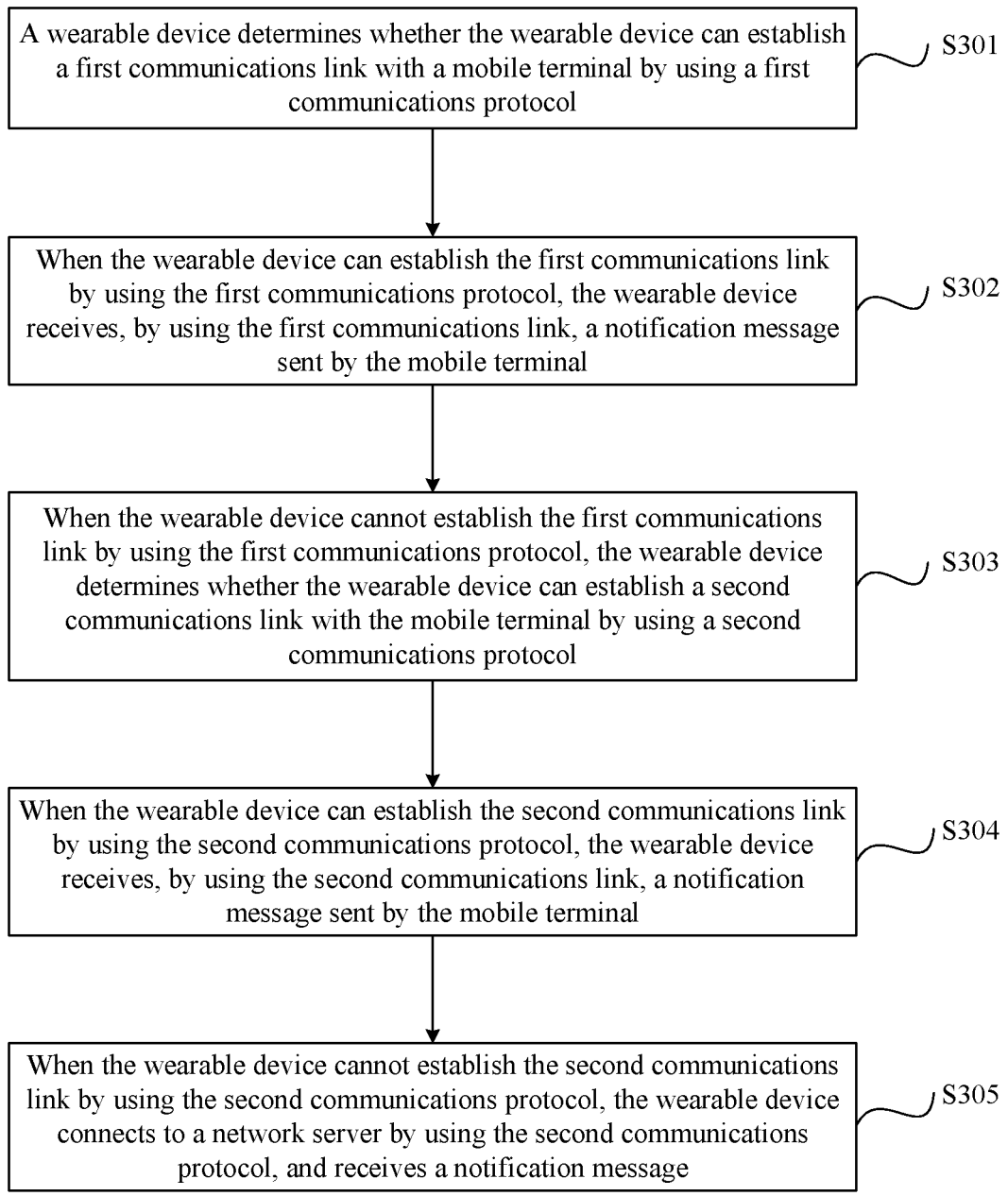
FIG. 3 is a flowchart of a method for communication between a wearable device and a mobile terminal according to an embodiment of the present disclosure.

Referring to FIG. 3, an embodiment of the present disclosure provides a method for communication between a wearable device and a mobile terminal. The method further includes the following steps.

S301: The wearable device determines whether the wearable device can establish a first communications link with the mobile terminal using a first communications protocol.

A communications protocol includes a short-distance wireless communications protocol and a long-distance wireless communications protocol. Establishing a communications link means that the wearable device and the mobile terminal are interconnected using a communications protocol such that functions such as data transmission and synchronization and message push can be implemented. For example, a step of establishing, by the wearable device, Bluetooth communication with the mobile terminal using a Bluetooth protocol may include enabling a Bluetooth function of the wearable device (for example, turning on a Bluetooth switch), searching for a pairable mobile terminal, performing, by the wearable device, pairing with the mobile terminal, and performing data transmission after the pairing between the wearable device and the mobile terminal is successful. It should be noted that establishing a communications link herein means that data transmission can be performed, excluding cases in which data transmission cannot be performed due to a cause such as a server fault, a network firewall block, network arrears, or an incorrect Wi-Fi password.

S302: After establishing the first communications link with the mobile terminal using the first communications protocol, the wearable device receives, using the first communications link, a notification message sent by the mobile terminal.

The notification message is a system message, an application program message, or various operation instructions pushed by the mobile terminal to the wearable device. The system message is, for example, an alarm, a call reminder, a data synchronization reminder, or a system update prompt. The application program message is, for example, a message pushed by an instant chat tool, a new email prompt, or a news push. The operation instruction is, for example, an instruction for restarting the wearable device or voluming up the wearable device. After receiving the notification message, the wearable device presents the notification message to a user. In addition to a visual notification (such as a notification bar or a dialog box) on a display apparatus of the wearable device, the presentation may further include an audio form (such as an alert tone or a ringtone), an audiovisual form, and/or a physical form (such as a vibration reminder or an LED reminder).

Optionally, the wearable device may periodically detect whether the wearable device can communicate with the mobile terminal using the first communications protocol, that is, periodically detect whether the first communications link between the wearable device and the mobile terminal is maintained. A detection technology may include detecting whether an IP address of the mobile terminal can be pinged successfully, whether the wearable device can receive a Bluetooth signal from the mobile terminal, or the like.

S303: When the wearable device cannot establish the first communications link with the mobile terminal using the first communications protocol, the wearable device determines whether the wearable device can establish a second communications link with the mobile terminal using a second communications protocol.

"First" and "second" herein are used merely to distinguish two communications protocols to indicate that the first communications protocol and the second communications protocol are different communications protocols. The first communications protocol may be named the second communications protocol, and the second communications protocol may also be named the first communications protocol. It may be understood that both the first communications protocol and the second communications protocol may be short-distance wireless communications protocols or long-distance wireless communications protocols. Alternatively, one may be a short-distance wireless communications protocol and the other may be a long-distance wireless communications protocol.

"Cannot establish a communications link" includes being unable to connect to a specific network, or being unable to perform data transmission though connected to a specific network. For example, a Bluetooth signal of the mobile terminal cannot be found, a Bluetooth signal is found but pairing fails, an input password is incorrect when the wearable device is connected to a Wi-Fi network, or the wearable device cannot be connected to the Internet due to arrears when connected to the Wi-Fi network with a correct password. These cases belong to "cannot establish a communications link".

S304: After establishing the second communications link with the mobile terminal using the second communications protocol, the wearable device receives, using the second communications link, a notification message sent by the mobile terminal.

When the second communications protocol is a short-distance wireless communications protocol, that the wearable device establishes the second communications link with the mobile terminal using the second communications protocol, and receives, using the second communications link, a notification message sent by the mobile terminal is discovering and connecting to, by the wearable device, the mobile terminal using a local-area-network device discovery protocol, and receiving, using the second communications link, the notification message sent by the mobile terminal.

The local-area-network device discovery protocol can be used to query whether the wearable device and the mobile terminal are in a same local area network. For example, the wearable device and the terminal device can be interconnected using a same Wi-Fi network. The local-area-network device discovery protocol may be a Universal Plug and Play protocol (UPnP), a zero-configuration networking protocol (Bonjour), a Digital Living Network Alliance protocol (DLNA), or the like.

Optionally, the wearable device may periodically detect whether the wearable device can communicate with the mobile terminal using the second communications protocol, that is, periodically detect whether the second communications link between the wearable device and the mobile terminal is maintained. A detection technology may include detecting whether an IP address of the mobile terminal can be pinged successfully, whether the wearable device can receive a Bluetooth signal from the mobile terminal, or the like.

S305: When the wearable device cannot establish the second communications link with the mobile terminal using the second communications protocol, the wearable device connects to a network server using the second communications protocol, and receives, using the network server, a notification message sent by the mobile terminal.

The receiving, using the network server, notification information sent by the mobile terminal is receiving, from the network server by the wearable device, the notification information sent by the mobile terminal and forwarded by the network server, or obtaining, from the network server by the wearable device, a token of the mobile terminal, and receiving, using the token, the notification information sent by a notification information server, where the notification information server is responsible for sending notification information to the mobile terminal, or receiving, from the network server by the wearable device, IP connection information of the mobile terminal, establishing, by the wearable device, an IP connection to the mobile terminal according to the IP connection information of the mobile terminal, and receiving, using the IP connection, the notification information sent by the mobile terminal.

Optionally, if the wearable device supports a third communications protocol, S305 may be, when the wearable device cannot establish the second communications link with the mobile terminal using the second communications protocol, determining, by the wearable device, whether the wearable device can establish a third communications link with the mobile terminal using the third communications protocol, and when the wearable device establishes the third communications link with the mobile terminal using the third communications protocol, receiving, by the wearable device using the third communications link, a notification message sent by the mobile terminal; or when the wearable device cannot establish the third communications link with the mobile terminal using the third communications protocol, connecting to, by the wearable device, a network server using the third communications protocol, and receiving, using the network server, a notification message sent by the mobile terminal.

Similarly, if the wearable device supports a fourth, a fifth, . . . , or a like communications protocol, the wearable device may also determine whether the wearable device can establish a fourth, a fifth, . . . , or a like communications link with the mobile terminal using the fourth, the fifth, . . . , or the like communications protocol, and when the wearable device establishes the fourth, the fifth, . . . , or the like communications link with the mobile terminal using the fourth, the fifth, . . . , and the like communications protocol, the wearable device receives, using the fourth, the fifth, . . . , or the like communications link, a notification message sent by the mobile terminal, or when the wearable device cannot establish the fourth, the fifth, . . . , or the like communications link with the mobile terminal using the fourth, the fifth, . . . , and the like communications protocol, the wearable device connects to a network server using the fourth, the fifth, . . . , or the like communications protocol, and receives, using the network server, a notification message sent by the mobile terminal.

It should be noted that the wearable device may be connected to the network server after the wearable device tries all supported communications protocols but cannot establish a corresponding communications link, or after the wearable device tries a supported communications protocols but cannot establish a corresponding communications link. This is not limited herein. Similarly, a communications protocol used by the wearable device to connect to the network server is not limited to a particular communications protocol, and may be any communications protocol supported by the wearable device. For example, when the wearable device cannot establish the third communications link with the mobile terminal using the third communications protocol, the wearable device may alternatively connect to a network server using the second communications protocol, and receive, using the network server, a notification message sent by the mobile terminal.

In the foregoing method for communication between the wearable device and the mobile terminal, using different communications protocol combinations, the wearable device may have different wireless communications modules and establish different communications links. The following describes several possible methods for communication between the wearable device and the mobile terminal. It should be noted that the following method for communication between the wearable device and the mobile terminal is merely one of available methods. Some steps in the method described below may be adjusted or changed according to the foregoing method for communication between the wearable device and the mobile terminal, without departing from the protection scope of the embodiments of the present disclosure.

Figure 4:
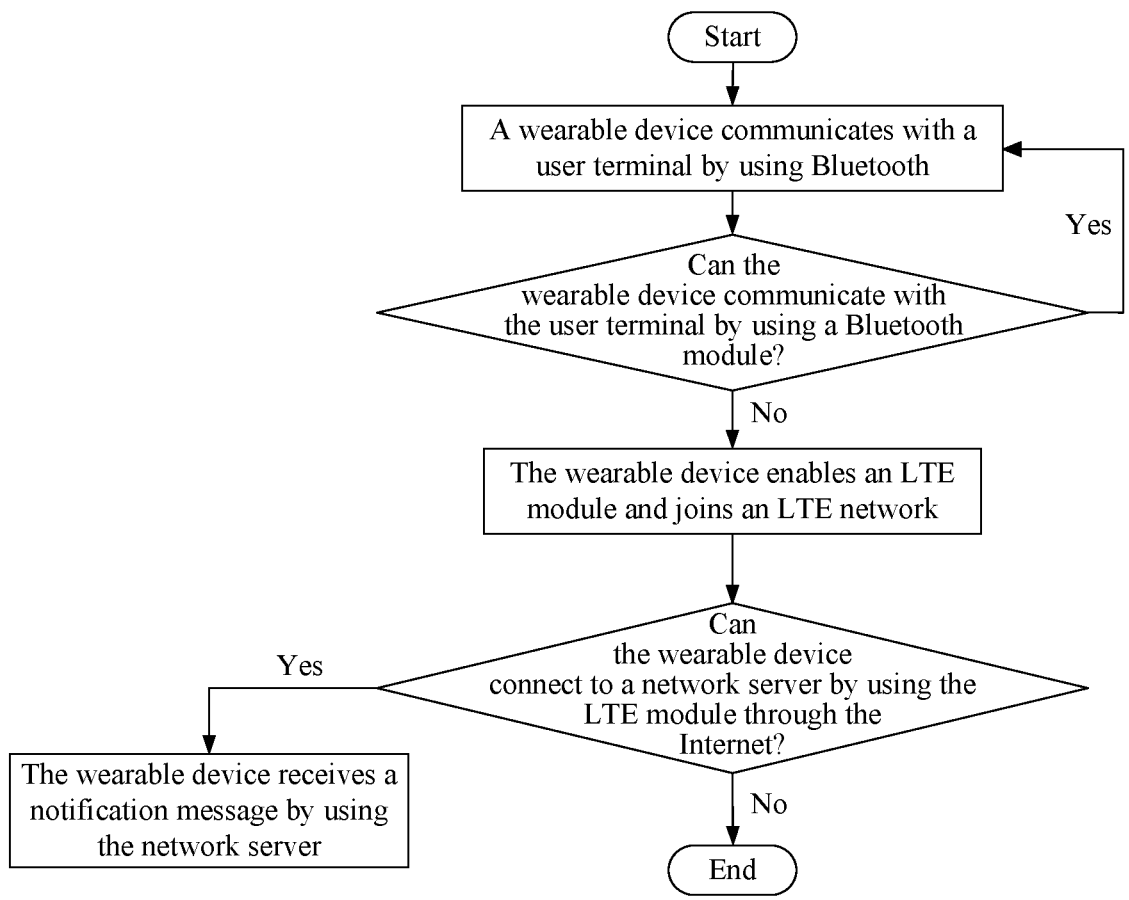
FIG. 4 is a flowchart of communication performed by a wearable device having a Bluetooth module and an LTE module according to an embodiment of the present disclosure.

Referring to FIG. 4, when a wearable device has at least one short-distance wireless communications module (for example, Bluetooth) and at least one long-distance wireless communications module (for example, LTE), communication between the wearable device and a mobile terminal may include the following steps.

S401: The wearable device establishes a Bluetooth communications link with the mobile terminal through a Bluetooth module using a Bluetooth protocol, and receives a notification message sent by the mobile terminal.

S402: The wearable device periodically detects whether the wearable device can communicate with the mobile terminal using the Bluetooth protocol, that is, periodically detects whether the wearable device keeps a Bluetooth connection to the mobile terminal. A detection technology may include detecting whether an IP address of the mobile terminal can be pinged successfully, whether the wearable device can receive a Bluetooth signal from the mobile terminal, or the like. If the wearable device cannot communicate with the mobile terminal using the Bluetooth module, S403 is performed.

S403: When the wearable device cannot establish the Bluetooth communications link with the mobile terminal using the Bluetooth protocol, the wearable device enables an LTE module, and automatically searches for and joins a specified LTE network.

S404: After accessing the LTE network, the wearable device connects to a specified network server using the LTE module through the LTE network. If the wearable device can be connected to the specified network server using the LTE module through the LTE network, S405 is performed. Otherwise, the procedure ends.

S405: The wearable device receives a notification message using the network server. A specific process may be receiving, by the wearable device, the notification message sent by the mobile terminal and forwarded by the network server; or receiving, by the wearable device, the notification message sent by a notification message server and forwarded by the network server, where the notification message server is responsible for sending a notification message to the mobile terminal, or after obtaining related information using the network server, receiving, by the wearable device, the notification message directly from a notification message server responsible for sending a notification message to the mobile terminal, or receiving, from the network server by the wearable device, an IP address and a port of the mobile terminal, establishing, by the wearable device, an IP connection to the mobile terminal according to the IP address and the port of the mobile terminal, and receiving, using the IP connection, the notification message sent by the mobile terminal. After receiving the notification message, the wearable device presents the notification message to a user. A presentation manner may be one or more of manners such as screen displaying, a sound reminder, a vibration, and an LED indicator prompt.

Optionally, when the wearable device has at least two short-distance wireless communications modules (for example, a Bluetooth module and a Wi-Fi module), or at least two long-distance wireless communications modules (for example, an LTE module and a WCDMA module), the wearable device may attempt to establish a communications link with the mobile terminal in sequence according to a preset order.

Figure 5:
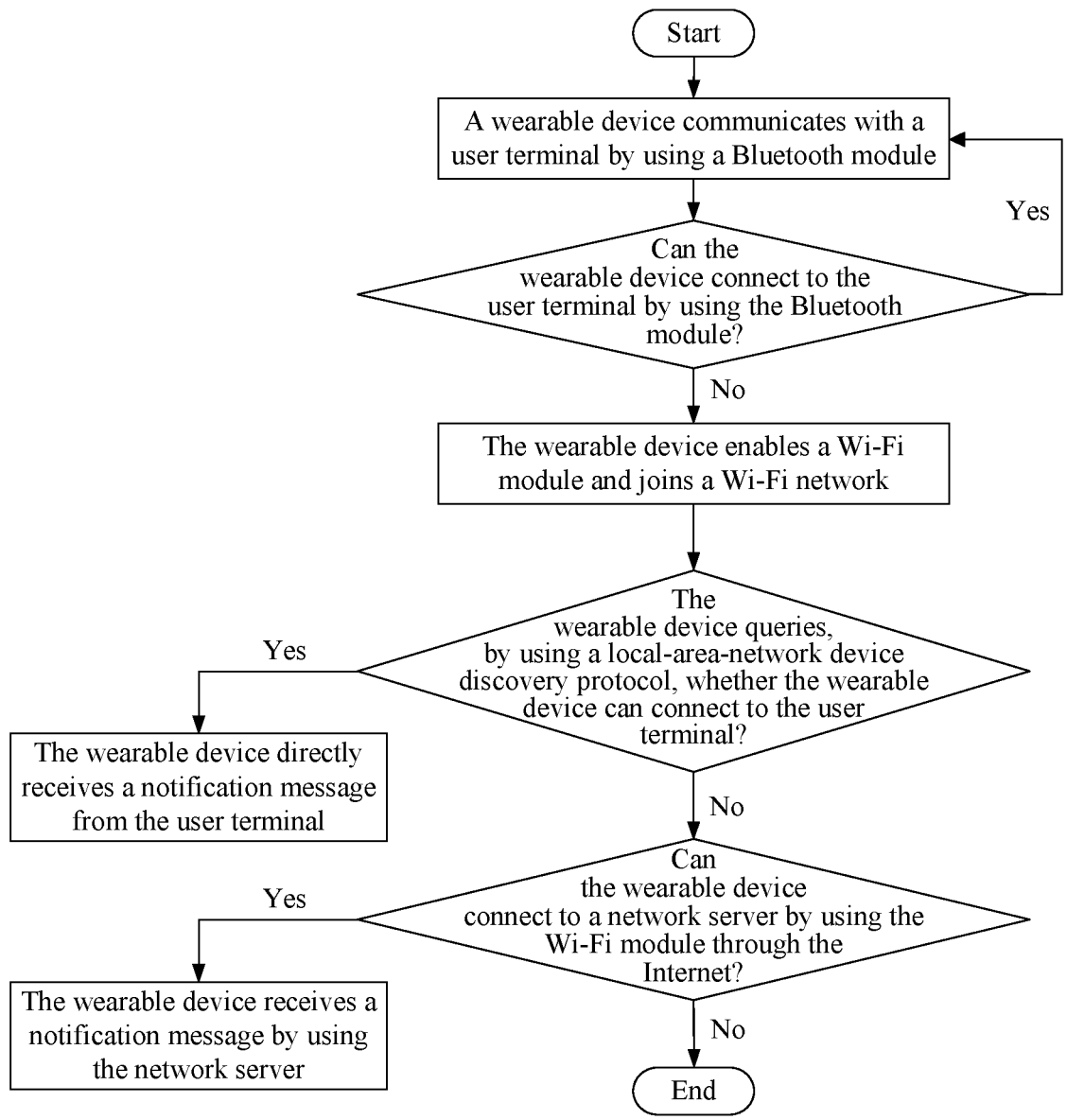
FIG. 5 is a flowchart of communication performed by a wearable device having a Bluetooth module and a Wi-Fi module according to an embodiment of the present disclosure.

Referring to FIG. 5, when a wearable device has at least two short-distance wireless communications modules (for example, Bluetooth and Wi-Fi), steps for communication between the wearable device and a mobile terminal may be as follows.

S501: The wearable device establishes a Bluetooth communications link with the mobile terminal through a Bluetooth module using a Bluetooth protocol, and receives a notification message sent by the mobile terminal.

S502: The wearable device periodically detects whether the wearable device can communicate with the mobile terminal using the Bluetooth protocol, that is, periodically detects whether the wearable device keeps a Bluetooth connection to the mobile terminal. A detection technology may include detecting, by the wearable device, whether an IP address of the mobile terminal can be pinged successfully, whether the wearable device can receive a Bluetooth signal from the mobile terminal, or the like. If the wearable device cannot communicate with the mobile terminal using the Bluetooth module, S503 is performed.

S503: When the wearable device cannot establish the Bluetooth connection to the mobile terminal using the Bluetooth protocol, the wearable device enables a Wi-Fi module, and searches for and joins a specified Wi-Fi network. "A specified Wi-Fi network" herein may be a Wi-Fi network configured by a user in advance, or a Wi-Fi network automatically determined by the wearable device and the mobile terminal by means of negotiation using a local-area-network discovery protocol. The Wi-Fi network herein may be a Wi-Fi network on which the mobile terminal serves as an access point (AP), or a peer-to-peer (P2P) network established between the wearable device and the mobile terminal.

S504: After accessing the Wi-Fi network, the wearable device queries, through the Wi-Fi module using the local-area-network device discovery protocol via the Wi-Fi network, whether there is a mobile terminal that can be connected in the same Wi-Fi local area network. The local-area-network device discovery protocol may be a UPnP, a Bonjour, or a DLNA. If the wearable device can be connected to the mobile terminal using the Wi-Fi module through the Wi-Fi network, the wearable device directly receives the notification information from the mobile terminal. Otherwise, S505 is performed. After receiving the notification message, the wearable device presents the notification message to the user. A presentation manner may be one or more of manners such as screen displaying, a sound reminder, a vibration, and an LED indicator prompt.

S505: The wearable device attempts to connect to a network server using the Wi-Fi module. If the wearable device can connect to the network server using the LTE module, S506 is performed. Otherwise, the procedure ends.

S506: The wearable device receives a notification message using the network server. A specific process may be receiving, by the wearable device, the notification message sent by the mobile terminal and forwarded by the network server; or receiving, by the wearable device, the notification message sent by a notification message server and forwarded by the network server, where the notification message server is responsible for sending a notification message to the mobile terminal, or after obtaining a related message using the network server, receiving, by the wearable device, the notification message directly from a notification message server responsible for sending a notification message to the mobile terminal, or receiving, from the network server by the wearable device, an IP address and a port of the mobile terminal, establishing, by the wearable device, an IP connection to the mobile terminal according to the IP address and the port of the mobile terminal, and receiving, using the IP connection, the notification message sent by the mobile terminal. After receiving the notification message, the wearable device presents the notification message to the user. The presentation manner may be one or more of manners such as screen displaying, a sound reminder, a vibration, and an LED indicator prompt.

Optionally, when the wearable device has at least two short-distance wireless communications modules, the wearable device may join a specified network using a corresponding short-distance wireless communications module in sequence according to a preset order, and attempt to connect to the mobile terminal using a corresponding short-distance wireless communications network. If the wearable device cannot connect to the mobile terminal using the short-distance wireless communications network, the wearable device attempts to connect to a specified network server using the short-distance wireless communications network such that the wearable device receives the notification message using the network server, and presents the notification message to the user.

Figure 6:
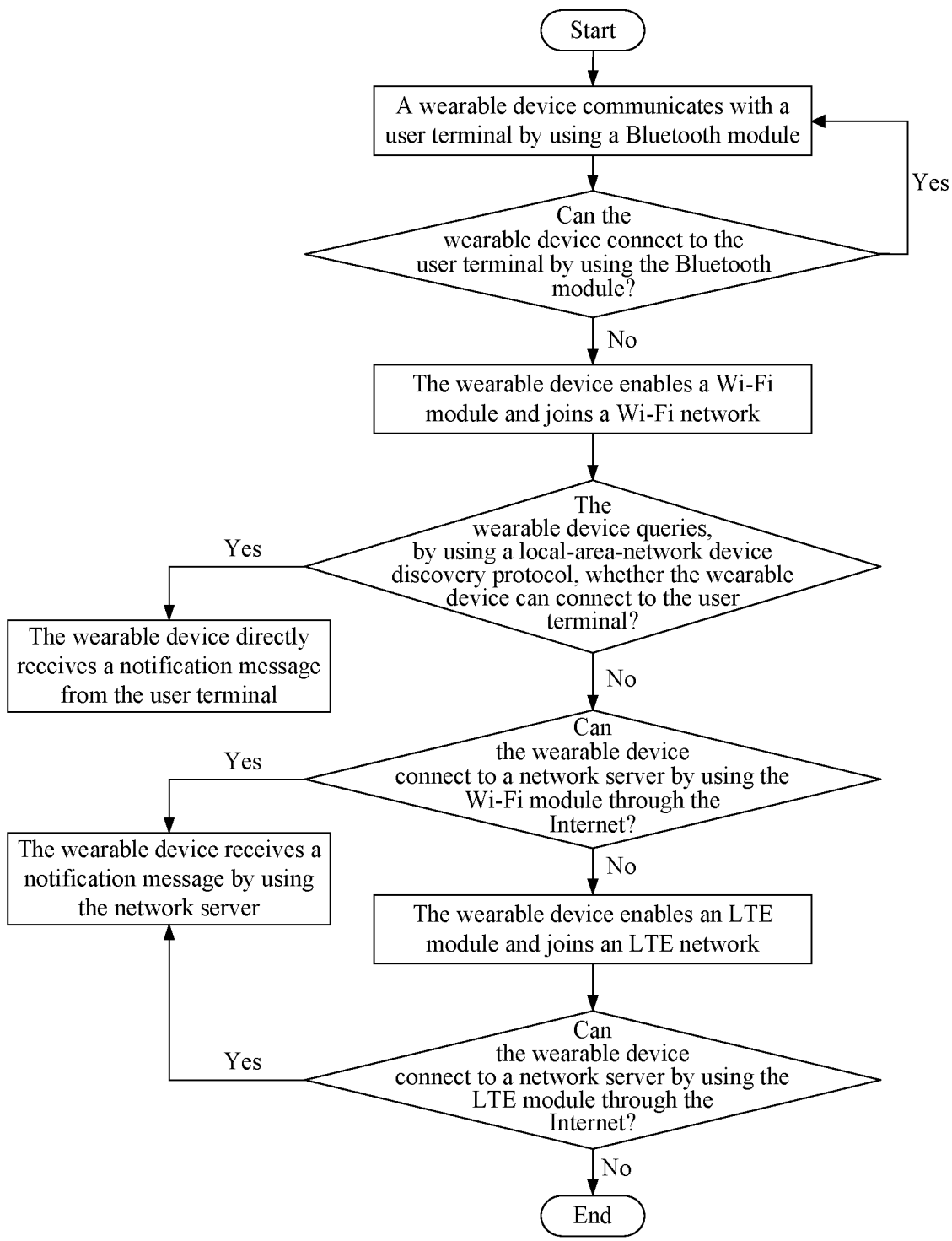
FIG. 6 is a flowchart of communication performed by a wearable device having a Bluetooth module, a Wi-Fi module, and an LTE module according to an embodiment of the present disclosure.

Referring to FIG. 6, when a wearable device has at least two short-distance wireless communications modules (for example, Bluetooth and Wi-Fi) and at least one long-distance wireless communications module (for example, LTE), steps for communication between the wearable device and a mobile terminal may be as follows.

S601: The wearable device establishes a Bluetooth communications link with the mobile terminal through a Bluetooth module using a Bluetooth protocol, and receives a notification message sent by the mobile terminal.

S602: The wearable device periodically detects whether the wearable device can communicate with the mobile terminal using the Bluetooth module. A detection technology may include detecting, by the wearable device, whether an IP address of the mobile terminal can be pinged successfully, whether the wearable device can receive a Bluetooth signal from the mobile terminal, or the like. If the wearable device cannot communicate with the mobile terminal using the Bluetooth module, S603 is performed.

S603: The wearable device enables a Wi-Fi module, and searches for and joins a specified Wi-Fi network. "A specified Wi-Fi network" herein may be a Wi-Fi network configured by a user in advance, or a Wi-Fi network automatically determined by the wearable device when the wearable device communicates with the mobile terminal using the Bluetooth module in step S601, or a Wi-Fi network automatically determined by the wearable device and the mobile terminal by means of negotiation using a local-area-network discovery protocol. The Wi-Fi network herein may be a Wi-Fi network on which the mobile terminal serves as an AP, or a P2P network established between the wearable device and the mobile terminal.

S604: After accessing the Wi-Fi network, the wearable device attempts to query, through the Wi-Fi module using the local-area-network device discovery protocol via the Wi-Fi network, whether the mobile terminal and the wearable device are in a same local area network and whether the wearable device can be connected to the mobile terminal. The local-area-network device discovery protocol may be a UPnP, a Bonjour, or a DLNA. If the wearable device can be connected to the mobile terminal using the Wi-Fi module through the Wi-Fi network, the wearable device directly receives the notification information from the mobile terminal. After receiving the notification message, the wearable device presents the notification message to the user. A presentation manner may be one or more of manners such as screen displaying, a sound reminder, a vibration, and an LED indicator prompt. If the wearable device cannot be connected to the mobile terminal using the Wi-Fi module through the Wi-Fi network, S605 is performed.

S605: The wearable device attempts to connect to a network server using the Wi-Fi module. If the wearable device can be connected to the network server using the Wi-Fi module, the wearable device receives the notification message using the network server. After receiving the notification message, the wearable device presents the notification message to the user. The presentation manner may be one or more of manners such as screen displaying, a sound reminder, a vibration, and an LED indicator prompt. If the wearable device cannot be connected to the network server using the Wi-Fi module, S606 is performed.

S606: The wearable device enables an LTE module, and automatically searches for and joins an LTE network.

S607: After accessing the LTE network, the wearable device attempts to connect to a specified network server using the LTE module through the LTE network. If the wearable device can be connected to the specified network server using the LTE module through the LTE network, S608 is performed. Otherwise, the procedure ends.

S608: The wearable device receives a notification message using the network server. A specific process may be receiving, by the wearable device, the notification message sent by the mobile terminal and forwarded by the network server, or receiving, by the wearable device, the notification message sent by a notification message server and forwarded by the network server, where the notification message server is responsible for sending a notification message to the mobile terminal, or after obtaining a related message (for example, a token) using the network server, receiving, by the wearable device using the obtained related message, the notification message directly from a notification message server responsible for sending a notification message to the mobile terminal, or receiving, from the network server by the wearable device, an IP address and a port of the mobile terminal, establishing, by the wearable device, an IP connection to the mobile terminal according to the IP address and the port of the mobile terminal, and receiving, using the IP connection, the notification message sent by the mobile terminal. After receiving the notification message, the wearable device presents the notification message to the user. The presentation manner may be one or more of manners such as screen displaying, a sound reminder, a vibration, and an LED indicator prompt.

Optionally, when the wearable device has at least two short-distance wireless communications modules, the wearable device may join a specified network using a corresponding short-distance wireless communications module in sequence according to a preset order, and attempt to connect to the mobile terminal using a corresponding short-distance wireless communications network. If the wearable device cannot connect to the mobile terminal using the short-distance wireless communications network, the wearable device attempts to connect to a specified network server using the short-distance wireless communications network such that the wearable device receives the notification message using the network server, and presents the notification message to the user.

It can be learned from the foregoing several possible methods for communication between the wearable device and the mobile terminal that when the wearable device has different communications modules, different communications links may be established with the mobile terminal using different communications module combinations. The methods shown in FIG. 4, FIG. 5, and FIG. 6 are merely several methods of available methods for communication between the wearable device and the mobile terminal. A person skilled in the art can adjust the methods shown in FIG. 4, FIG. 5, and FIG. 6, without departing from the protection scope of the present disclosure.

Figure 7:
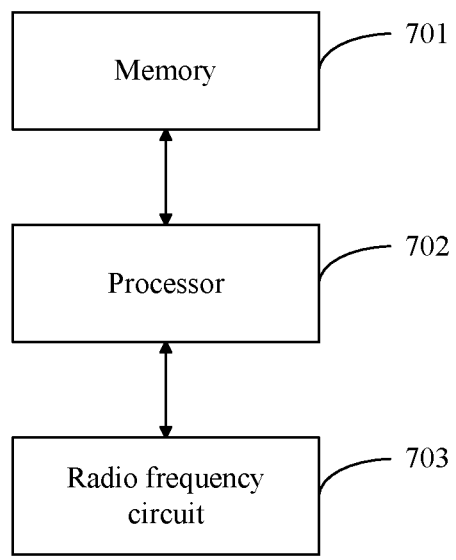
FIG. 7 is a schematic diagram of an apparatus according to an embodiment of the present disclosure.

Referring to FIG. 7, an embodiment of the present disclosure provides an apparatus, including a memory 701, a processor 702, and a radio frequency circuit 703. The processor 702 establishes, according to a connection method stored in the memory 701, a communications link between a wearable device and a mobile terminal using the radio frequency circuit 703. The connection method is determining, by the wearable device, whether the wearable device can establish a first communications link with the mobile terminal using a first communications protocol, and when the wearable device establishes the first communications link with the mobile terminal using the first communications protocol, receiving, by the wearable device using the first communications link, a notification message sent by the mobile terminal, or when the wearable device cannot establish the first communications link with the mobile terminal using the first communications protocol, determining, by the wearable device, whether the wearable device can establish a second communications link with the mobile terminal using a second communications protocol, and when the wearable device establishes the second communications link with the mobile terminal using the second communications protocol, receiving, by the wearable device using the second communications link, a notification message sent by the mobile terminal, or when the wearable device cannot establish the second communications link with the mobile terminal using the second communications protocol, connecting to, by the wearable device, a network server using the second communications protocol, and receiving, using the network server, a notification message sent by the mobile terminal. A specific method is the same as the foregoing method for communication between a wearable device and a mobile terminal.

In addition, referring to FIG. 7, the embodiment of the present disclosure provides an apparatus, including a memory 701, a processor 702, a radio frequency circuit 703, and one or more programs. The one or more programs are stored in the memory 701 and are configured to be executed by the processor 702. The one or more programs include an instruction, and the instruction is used to execute the following actions, determining, by a wearable device, whether the wearable device can establish a first communications link with a mobile terminal using a first communications protocol, and when the wearable device establishes the first communications link with the mobile terminal using the first communications protocol, receiving, by the wearable device using the first communications link, a notification message sent by the mobile terminal, or when the wearable device cannot establish the first communications link with the mobile terminal using the first communications protocol, determining, by the wearable device, whether the wearable device can establish a second communications link with the mobile terminal using a second communications protocol, and when the wearable device establishes the second communications link with the mobile terminal using the second communications protocol, receiving, by the wearable device using the second communications link, a notification message sent by the mobile terminal, or when the wearable device cannot establish the second communications link with the mobile terminal using the second communications protocol, connecting to, by the wearable device, a network server using the second communications protocol, and receiving, using the network server, a notification message sent by the mobile terminal. A specific method is the same as the foregoing method for communication between a wearable device and a mobile terminal.

Figure 8:
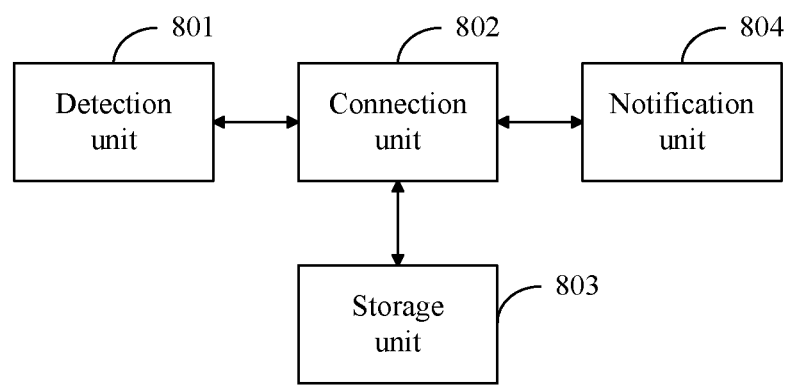
FIG. 8 is a schematic diagram of an apparatus for communication between a wearable device and a mobile terminal according to an embodiment of the present disclosure.

In addition, referring to FIG. 8, another embodiment of the present disclosure provides an apparatus for communication between a wearable device and a mobile terminal, including a detection unit 801, a connection unit 802, a storage unit 803, and a notification unit 804. The detection unit 801 is configured to detect, during establishment of a communications link between the wearable device and the mobile terminal, a wireless signal that is supported by the wearable device and that indicates that the wireless communications link can be established. The connection unit 802 is configured to access a corresponding wireless network according to a connection method stored in the storage unit 803, establish a communications link between the wearable device and the mobile terminal, and receive a notification message sent by the mobile terminal. The storage unit 803 is configured to store the connection method for establishing the communications link between the wearable device and the mobile terminal. The notification unit 804 is configured to present the notification message received by the wearable device from the terminal device. The connection method is determining, by the wearable device, whether the wearable device can establish a first communications link with the mobile terminal using a first communications protocol, and when the wearable device establishes the first communications link with the mobile terminal using the first communications protocol, receiving, by the wearable device using the first communications link, a notification message sent by the mobile terminal, or when the wearable device cannot establish the first communications link with the mobile terminal using the first communications protocol, determining, by the wearable device, whether the wearable device can establish a second communications link with the mobile terminal using a second communications protocol, and when the wearable device establishes the second communications link with the mobile terminal using the second communications protocol, receiving, by the wearable device using the second communications link, a notification message sent by the mobile terminal, or when the wearable device cannot establish the second communications link with the mobile terminal using the second communications protocol, connecting to, by the wearable device, a network server using the second communications protocol, and receiving, using the network server, a notification message sent by the mobile terminal. A specific method is the same as the foregoing method for communication between a wearable device and a mobile terminal.

In addition, still another embodiment of the present disclosure provides a computer storage medium storing one or more programs. The one or more programs include an instruction, and the instruction is used to execute the following actions, determining, by a wearable device, whether the wearable device can establish a first communications link with a mobile terminal using a first communications protocol, and when the wearable device establishes the first communications link with the mobile terminal using the first communications protocol, receiving, by the wearable device using the first communications link, a notification message sent by the mobile terminal, or when the wearable device cannot establish the first communications link with the mobile terminal using the first communications protocol, determining, by the wearable device, whether the wearable device can establish a second communications link with the mobile terminal using a second communications protocol, and when the wearable device establishes the second communications link with the mobile terminal using the second communications protocol, receiving, by the wearable device using the second communications link, a notification message sent by the mobile terminal, or when the wearable device cannot establish the second communications link with the mobile terminal using the second communications protocol, connecting to, by the wearable device, a network server using the second communications protocol, and receiving, using the network server, a notification message sent by the mobile terminal. A specific method is the same as the foregoing method for communication between a wearable device and a mobile terminal.

A person of ordinary skill in the art may understand that, in combination with the examples described in the embodiments disclosed in this specification, units, algorithms and method steps may be implemented by a combination of computer software and electronic hardware. Whether the functions are implemented by hardware or software depends on particular applications and design constraint conditions of the technical solutions. A person skilled in the art may use different methods to implement the described functions for each particular application, but it should not be considered that the implementation goes beyond the scope of the present disclosure.

It should be understood that, the term "and/or" used in this specification indicates and includes any or all possible combinations of one or more items in associated listed items. It should be further understood that the term "include" and/or "include" used in this specification specifies presence of features, integers, steps, operations, elements, and/or components, with presence or addition of one or more other features, integers, steps, operations, elements, components, and/or their combinations not excluded.

It should be further understood that although the terms such as "first" and "second" may be used to describe various elements in this specification, the elements should not be limited by the terms. The terms are merely used to distinguish one element from another element. For example, the first communications protocol may be named the second communications protocol, and similarly, the second communications protocol may be named the first communications protocol, without departing from the scope of the present disclosure.

The terms used in the description of the present disclosure in this specification are merely for the purpose of describing specific embodiments, and are not intended to limit the present disclosure. The terms "one", "a" and "this" of singular forms used in this specification and the appended claims of the present disclosure are also intended to include plural forms, unless otherwise specified in the context clearly.

The units described as separate parts may or may not be physically separate, and parts displayed as units may or may not be physical units, may be located in one position, or may be distributed on a plurality of network units. A part or all of the units may be selected according to actual needs to achieve the objectives of the solutions of the embodiments of the present disclosure. Functional units in the embodiments of the present disclosure may be integrated into one processing unit, or each of the units may exist alone physically, or two or more units are integrated into one unit.

A person of ordinary skill in the art may understand that all or a part of the steps of the method embodiments may be implemented by a program instructing relevant hardware. The program may be stored in a computer readable storage medium. When the program runs, the steps of the method embodiments are performed. The foregoing storage medium includes any medium that can store program code, such as a read-only memory (ROM), a random-access memory (RAM), a magnetic disk, or an optical disc.

The foregoing descriptions are merely specific implementations of the present disclosure, but are not intended to limit the protection scope of the present disclosure. Any variation or replacement readily figured out by a person skilled in the art within the technical scope disclosed in the present disclosure shall fall within the protection scope of the present disclosure. Therefore, the protection scope of the present disclosure shall be subject to the protection scope of the claims.

What is claimed is:

1. A method for communication between a wearable device and a mobile terminal, the method comprising:
   determining, by the wearable device, whether the wearable device is able to establish a first communications link with the mobile terminal using a first communications protocol;
   receiving, by the wearable device using the first communications link, a first notification message from the mobile terminal when the wearable device establishes the first communications link with the mobile terminal using the first communications protocol;
   displaying, by the wearable device, the first notification message when the wearable device establishes the first communications link with the mobile terminal using the first communications protocol;
   determining, by the wearable device, whether the wearable device can establish a second communications link with the mobile terminal using a second communications protocol when the wearable device is unable to establish the first communications link with the mobile terminal using the first communications protocol;
   receiving, by the wearable device using the second communications link, the first notification message from the mobile terminal when the wearable device establishes the second communications link with the mobile terminal using the second communications protocol; and
   when the wearable device is unable to establish the second communications link with the mobile terminal using the second communications protocol:
      connecting, by the wearable device, to a network server using the second communications protocol; and
      receiving, using the network server, the first notification message from the mobile terminal by either:
         obtaining, from the network server by the wearable device, a token of the mobile terminal; and
         receiving, using the token, the first notification message from a notification message server configured to send notification information to the mobile terminal; or
         receiving, from the network server by the wearable device, internet protocol (IP) connection information of the mobile terminal;
         establishing, by the wearable device, an IP connection to the mobile terminal according to the IP connection information of the mobile terminal; and
         receiving, using the IP connection, notification information from the mobile terminal.

2. The method of claim 1, further comprising establishing the first communications link with the mobile terminal using the first communications protocol at least in part by periodically detecting, by the wearable device, whether the wearable device can communicate with the mobile terminal using the first communications protocol.

3. The method of claim 1, further comprising determining, by the wearable device, whether the wearable device can establish a third communications link with the mobile terminal using a third communications protocol when the wearable device cannot establish the second communications link with the mobile terminal using the second communications protocol.

4. The method of claim 1, wherein receiving, by the wearable device using the second communications link, the first notification message from the mobile terminal when the wearable device establishes the second communications link with the mobile terminal using the second communications protocol further comprises:
   discovering, by the wearable device, the mobile terminal using a local-area-network device discovery protocol;
   connecting, by the wearable device, to the mobile terminal using the local-area-network device discovery protocol; and
   receiving, using the second communications link, the first notification message from the mobile terminal when the second communications protocol is a short-distance wireless communications protocol.

5. The method of claim 4, wherein the local-area-network device discovery protocol comprises a Universal Plug and Play protocol, a zero-configuration networking protocol, or a Digital Living Network Alliance protocol.

6. The method of claim 1, further comprising attempting to establish a communications link with the mobile terminal in sequence according to a preset order when the wearable device has at least two short-distance wireless communications modules.

7. The method of claim 1, further comprising attempting to establish a communications link with the mobile terminal in sequence according to a preset order when the wearable device has at least two long-distance wireless communications modules.

8. A wearable device, comprising:
   a processor; and
   memory coupled to the processor and storing executable instructions that, when executed by the processor, cause the wearable device to be configured to:
      determine whether the wearable device can establish a first communications link with a mobile terminal using a first communications protocol;
      receive, using the first communications link, a first notification message from the mobile terminal when the wearable device establishes the first communications link with the mobile terminal using the first communications protocol;
      display the first notification message when the wearable device establishes the first communications link with the mobile terminal using the first communications protocol;
      determine whether the wearable device can establish a second communications link with the mobile terminal using a second communications protocol when the wearable device cannot establish the first communications link with the mobile terminal using the first communications protocol;
      receive, using the second communications link, the first notification message from the mobile terminal when the wearable device establishes the second communications link with the mobile terminal using the second communications protocol; and
      when the wearable device cannot establish the second communications link with the mobile terminal using the second communications protocol:
         connect to a network server using the second communications protocol; and receive the first notification message using the network server by either:
: obtaining, from the network server by the wearable device, a token of the mobile terminal; and
: receiving, using the token, the first notification message from a notification message server configured to send notification information to the mobile terminal; or
: receiving, from the network server by the wearable device, internet protocol (IP) connection information of the mobile terminal;
: establishing, by the wearable device, an IP connection to the mobile terminal according to the IP connection information of the mobile terminal; and
: receiving, using the IP connection, notification information from the mobile terminal.

9. The wearable device of claim 8, wherein the executable instructions further cause the wearable device to establish the first communications link with the mobile terminal using the first communications protocol at least in part by causing the wearable device to periodically detect whether the wearable device can communicate with the mobile terminal using the first communications protocol.

10. The wearable device of claim 8, wherein the executable instructions further cause the wearable device to determine whether the wearable device can establish a third communications link with the mobile terminal using a third communications protocol when the wearable device cannot establish the second communications link with the mobile terminal using the second communications protocol.

11. The wearable device of claim 8, wherein the executable instructions cause the wearable device to receive, using the second communications link, the first notification message from the mobile terminal when the wearable device establishes the second communications link with the mobile terminal using the second communications protocol by causing the wearable device to:
: discover the mobile terminal using a local-area-network device discovery protocol;
: connect to the mobile terminal using the local-area-network device discovery protocol; and
: receive, using the second communications link, the first notification message from the mobile terminal when the second communications protocol is a short-distance wireless communications protocol.

12. The wearable device of claim 11, wherein the local-area-network device discovery protocol comprises a Universal Plug and Play protocol, a zero-configuration networking protocol, or a Digital Living Network Alliance protocol.

13. A non-transitory computer readable storage medium storing instructions that, when executed by a processor, cause a wearable device to be configured to:
: determine whether the wearable device is able to establish a first communications link with a mobile terminal using a first communications protocol;
: receive, using the first communications link, a first notification message from the mobile terminal when the wearable device establishes the first communications link with the mobile terminal using the first communications protocol;
: determine whether the wearable device can establish a second communications link with the mobile terminal using a second communications protocol when the wearable device is unable to establish the first communications link with the mobile terminal using the first communications protocol;
: receive, using the second communications link, the first notification message from the mobile terminal when the wearable device establishes the second communications link with the mobile terminal using the second communications protocol; and
: when the wearable device is unable to establish the second communications link with the mobile terminal using the second communications protocol:
:: connect to a network server using the second communications protocol; and
:: receive, using the network server, the first notification message from the mobile terminal by either:
::: obtaining, from the network server, a token of the mobile terminal; and
::: receiving, using the token, the first notification message from a notification message server configured to send notification information to the mobile terminal; or
::: receiving, from the network server, internet protocol (IP) connection information of the mobile terminal;
::: establishing an IP connection to the mobile terminal according to the IP connection information of the mobile terminal; and
::: receiving, using the IP connection, notification information from the mobile terminal.

14. The non-transitory computer readable storage medium of claim 13, wherein the instructions further cause the wearable device to be configured to establish the first communications link with the mobile terminal using the first communications protocol by causing the wearable device to be configured to periodically detect whether the wearable device can communicate with the mobile terminal using the first communications protocol.

15. The non-transitory computer readable storage medium of claim 13, wherein the instructions cause the wearable device to be configured to receive the first notification message from the mobile terminal by causing the wearable device to be configured to:
: discover the mobile terminal using a local-area-network device discovery protocol when the second communications protocol is a short-distance wireless communications protocol;
: connect to the mobile terminal using the local-area-network device discovery protocol; and
: receive, using the second communications link, the first notification message from the mobile terminal.

16. The non-transitory computer readable storage medium of claim 15, wherein the local-area-network device discovery protocol comprises a Universal Plug and Play protocol, a zero-configuration networking protocol, or a Digital Living Network Alliance protocol.

* * * * *